United States Patent
Kimura et al.

(10) Patent No.: US 7,978,434 B2
(45) Date of Patent: Jul. 12, 2011

(54) MAGNETIC RECORDING MEDIUM, METHOD OF FABRICATING THE SAME, AND MAGNETIC RECORDING APPARATUS

(75) Inventors: Kaori Kimura, Tokyo (JP); Masatoshi Sakurai, Tokyo (JP); Yoshiyuki Kamata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 957 days.

(21) Appl. No.: 11/902,066

(22) Filed: Sep. 18, 2007

(65) Prior Publication Data
US 2008/0192606 A1 Aug. 14, 2008

(30) Foreign Application Priority Data
Oct. 3, 2006 (JP) .................. 2006-272016

(51) Int. Cl.
G11B 5/65 (2006.01)
G11B 5/84 (2006.01)

(52) U.S. Cl. ............ 360/135; 360/131; 428/842.1
(58) Field of Classification Search .......... 360/131, 360/135; 428/323, 328, 329, 826, 842.1; 427/130, 131
See application file for complete search history.

(56) References Cited

U.S. PATENT DOCUMENTS

| | | | |
|---|---|---|---|
| 4,052,710 A | 10/1977 | Calhoun et al. | |
| 4,052,711 A | 10/1977 | Lin et al. | |
| 5,317,468 A | 5/1994 | Wakabayashi et al. | |
| 5,587,223 A | 12/1996 | White | |
| 5,590,009 A | 12/1996 | Ishida | |
| 5,604,013 A | 2/1997 | Yamaguchi et al. | |
| 5,675,532 A | 10/1997 | Gemma et al. | |
| 5,956,216 A | 9/1999 | Chou | |
| 5,981,054 A | 11/1999 | Hikosaka et al. | |
| 6,021,013 A | 2/2000 | Albrecht et al. | |
| 6,125,095 A | 9/2000 | Gemma et al. | |
| 6,162,532 A | 12/2000 | Black et al. | |
| 6,168,845 B1 | 1/2001 | Fontana et al. | |
| 6,197,399 B1 | 3/2001 | Naito et al. | |
| 6,249,396 B1 | 6/2001 | Gray | |
| 6,303,277 B1 | 10/2001 | Hieda et al. | |
| 6,387,530 B1 | 5/2002 | Liu et al. | |
| 6,421,195 B1 | 7/2002 | Rubin et al. | |

(Continued)

FOREIGN PATENT DOCUMENTS

JP 62-202303 9/1987

(Continued)

OTHER PUBLICATIONS

R.A. Segalman et al.: "Controlling the Long Range Ordering of Block Copolymer Micelle Films," Abstract Submitted for the Mar. 2000 Meeting of the American Physical Society.

(Continued)

*Primary Examiner* — William J Klimowicz
(74) *Attorney, Agent, or Firm* — Nixon & Vanderhye, P.C.

(57) ABSTRACT

A magnetic recording medium includes recording regions formed on a substrate, isolation regions formed between the recording regions so as to define the recording regions, and recording dots formed of a dot-like magnetic recording layer and arrayed in the recording regions, the recording dots including first recording dots arrayed in a line in each edge part of each recording region along the isolation region and second recording dots arrayed into a regular lattice in a central part of each recording region. A distance between a first recording dot and a second recording dot which are nearest neighboring is larger than a distance between second recording dots which are nearest neighboring.

13 Claims, 6 Drawing Sheets

U.S. PATENT DOCUMENTS

| | | |
|---|---|---|
| 6,537,638 B2 | 3/2003 | Do et al. |
| 6,565,763 B1 | 5/2003 | Asakawa et al. |
| 6,565,764 B2 | 5/2003 | Hiraoka et al. |
| 6,602,620 B1 * | 8/2003 | Kikitsu et al. .............. 428/842.2 |
| 6,620,532 B2 * | 9/2003 | Aoyama .................... 428/835.5 |
| 6,748,865 B2 | 6/2004 | Sakurai et al. |
| 6,841,224 B2 | 1/2005 | Kamata et al. |
| 6,850,480 B1 | 2/2005 | Naito et al. |
| 6,977,108 B2 * | 12/2005 | Hieda et al. ................... 428/64.2 |
| 7,203,969 B2 | 4/2007 | Sakurai et al. |
| 7,524,428 B2 | 4/2009 | Fujimoto et al. |
| 2001/0016271 A1 | 8/2001 | Aoyama |
| 2002/0132083 A1 * | 9/2002 | Weller et al. ................. 428/65.3 |
| 2002/0168548 A1 * | 11/2002 | Sakurai et al. .......... 428/694 BR |
| 2003/0090826 A1 | 5/2003 | Richter et al. |
| 2006/0061900 A1 | 3/2006 | Ohtsuka et al. |
| 2008/0002295 A1 * | 1/2008 | Sakurai et al. ................. 360/131 |
| 2008/0085479 A1 * | 4/2008 | Yamaguchi et al. .......... 430/327 |

FOREIGN PATENT DOCUMENTS

| | | |
|---|---|---|
| JP | 63-261578 | 10/1988 |
| JP | 3-028559 | 3/1991 |
| JP | 10-255258 | 9/1998 |
| JP | 2000-195034 | 7/2000 |
| JP | 2000-195036 | 7/2000 |
| JP | 2000-215441 | 8/2000 |
| JP | 2000-251236 | 9/2000 |
| JP | 2002-279616 | 9/2002 |
| JP | 2002-334414 | 11/2002 |
| JP | 2004303302 A * | 10/2004 |
| JP | 2005122820 A * | 5/2005 |
| JP | 2006-73137 | 3/2006 |

OTHER PUBLICATIONS

Sakurai et al., U.S. Appl. No. 10/138,572, filed May 6, 2002.
Hieda et al., U.S. Appl. No. 10/102,812, filed Mar. 22, 2002.

* cited by examiner

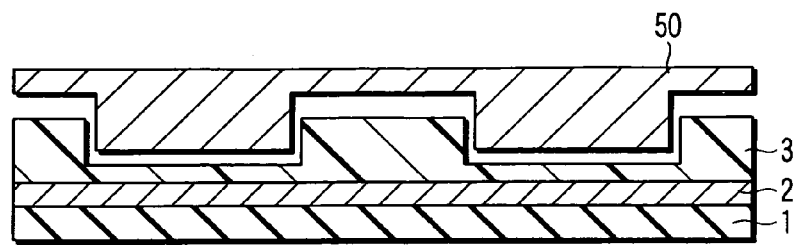
F I G. 5A
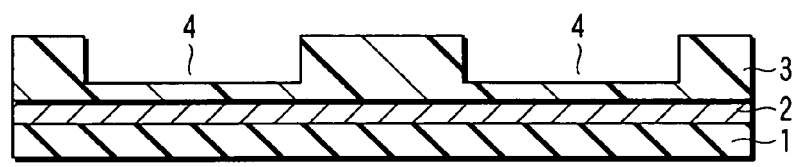
F I G. 5B
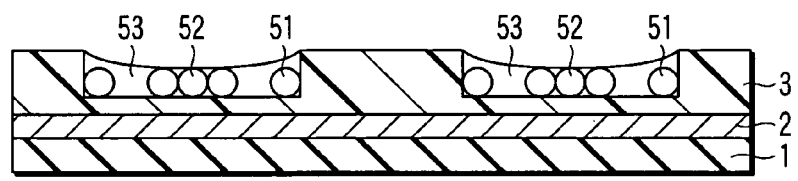
F I G. 5C
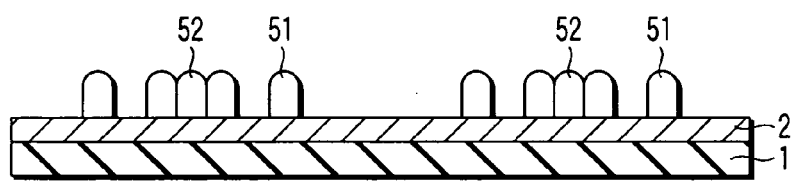
F I G. 5D
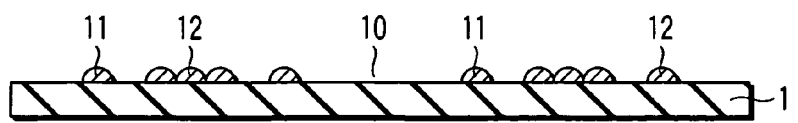
F I G. 5E

MAGNETIC RECORDING MEDIUM, METHOD OF FABRICATING THE SAME, AND MAGNETIC RECORDING APPARATUS

CROSS-REFERENCE TO RELATED APPLICATIONS

This application is based upon and claims the benefit of priority from prior Japanese Patent Application No. 2006-272016, filed Oct. 3, 2006, the entire contents of which are incorporated herein by reference.

BACKGROUND OF THE INVENTION

1. Field of the Invention

The present invention relates to a magnetic recording medium which is classified into patterned media, a method of fabricating the magnetic recording medium, and a magnetic recording apparatus in which the magnetic recording medium is installed.

2. Description of the Related Art

In the modern information society, the amount of data, which is recorded on recording media, has been increasing more and more. To keep up with the increase in amount of data, there has been a demand for a recording medium and a recording apparatus with a dramatically increased recording density. As regards hard disks for which there is an increasing demand as large-capacity, inexpensive magnetic recording media, it is said that a recording density of 1 terabits per square inch or more, which is about ten times higher than a current recording density, will be required several years after.

In a currently available hard disk, recording of one bit is effected on a certain region of a magnetic recording layer formed of a polycrystalline material including fine magnetic particles. In order to increase the recording capacity of the hard disk, it is necessary to decrease a recording mark size usable for one bit so as to increase the recording density. However, if the recording mark size is simply decreased, the influence of noise will not be negligible. On the other hand, if the size of each magnetic particle is decreased, a problem of thermal fluctuation occurs, and recording cannot be maintained at ambient temperature.

To avoid this problem, patterned media have been proposed. In the patterned media, a recording material is separated by a non-recording material in advance, and recording/reproduction is performed by using each dot-like particle of recording material (recording dot) as one bit.

The patterned media are designed on the assumption of a recording density of several-hundred gigabits per inch. Accordingly, the size of a recording dot of one bit becomes several-ten nm or less. Conventionally, it has been thought that electron-beam lithography or focused ion beam lithography may be applied as a method of forming such a fine pattern on a substrate. However, to fabricate patterned media by these lithography techniques is not practical in terms of processing time and cost.

In order to fabricate patterned media at low cost in a short time period, the following methods have been proposed: (1) a method in which dot-like fine particles are arrayed on a substrate, and a magnetic material is patterned by using the fine particles as a mask; (2) a method in which a magnetic material is filled in anodized alumina nano-holes; and (3) a method in which a self-assembling phase-separated structure of a block copolymer is used to pattern a magnetic material. Each of these methods enables to pattern the substrate at a time on the entire surface thereof. However, these methods cannot control the orientation of the patterns. Thus, a microstructure having a regularly arrayed pattern can be formed microscopically. However, since many such microstructures are formed at random, defects and grain boundaries are formed at interfaces between the microstructures. When the entire substrate is observed, the orientations of arrayed patterns become irregular.

To avoid this problem, it is thought effective to define recording regions by forming guide patterns having predetermined orientation, such as a linear or lattice-shaped protruded structure, on the surface of the substrate (JP-A 2002-279616 (KOKAI) and JP-A 2002-334414 (KOKAI)). The guide patterns are formed in accordance with isolation regions which surround and separate recording regions. If a self-assembling phenomenon takes place in the recording regions under the condition that the guide patterns are formed, dot-patterns of a self-assembling material are arrayed along the guide patterns. Moreover, by transferring the dot-patterns of the self-assembling material to a magnetic material, it becomes possible to form regularly arrayed recording dots. If the recording dots are formed by making use of the guide patterns, the patterns which are regularly arrayed on the entire substrate can be formed. Therefore, it is possible to expect that read/write can exactly be performed on each dot of the obtained patterned media by a read/write head of a magnetic recording apparatus.

In the meantime, the recording dots need to have read-only recording dots, on which address data for recording regions, for instance, are written. However, as regards the patterned media in which all recording dots are regularly arrayed, it has been found that such a problem arises that write errors on the read-only dots tends to easily occur.

BRIEF SUMMARY OF THE INVENTION

According to an aspect of the present invention, there is provided a magnetic recording medium comprising: recording regions formed on a substrate; isolation regions formed between the recording regions so as to define the recording regions; and recording dots formed of a dot-like magnetic recording layer and arrayed in the recording regions, the recording dots including first recording dots arrayed in a line in each edge part of each recording region along the isolation region and second recording dots arrayed into a regular lattice in a central part of each recording region, a distance between a first recording dot and a second recording dot which are nearest neighboring being larger than a distance between second recording dots which are nearest neighboring.

According to another aspect of the present invention, there is provided a method of fabricating a magnetic recording medium, comprising: depositing a magnetic recording layer on a substrate; forming, on the magnetic recording layer, guide patterns corresponding to isolation regions which define recording regions; causing a self-assembling material to self-assemble in the recording regions defined by the guide patterns to form first dots arrayed in a line in each edge part of each recording region along the isolation region and second dots arrayed into a regular lattice in a central part of each recording region, a distance between a first dot and a recording dot which are nearest neighboring being larger than a distance between second dots which are nearest neighboring; and transferring patterns of the first and second dots to the magnetic recording layer to form first recording dots and second recording dots which are formed of a dot-like magnetic recording layer.

BRIEF DESCRIPTION OF THE SEVERAL VIEWS OF THE DRAWING

FIGS. 5A, 5B, 5C, 5D and 5E are cross-sectional views illustrating a method of fabricating a magnetic recording medium according to an embodiment of the invention;

DETAILED DESCRIPTION OF THE INVENTION

Figure 1A:
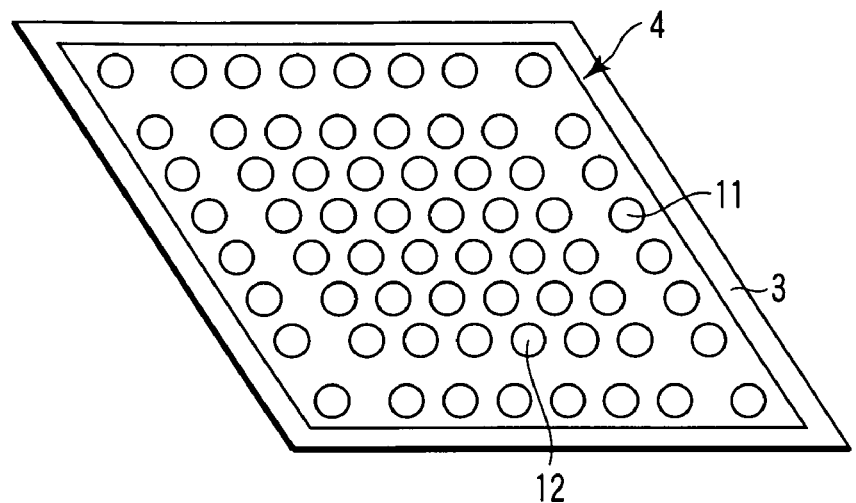
FIGS. 1A and 1B are plan views of a magnetic recording medium according to an embodiment of the invention.

Embodiments of the present invention will now be described in detail.

The shape of the entirety of a magnetic recording medium according to an embodiment of the invention may be, for instance, a disk or a card, and is not limited to particular shapes. In the case of a disk-type recording medium, a magnetic recording layer is formed on the surface of a disk-shaped substrate. The disc is rotatably supported. A read/write head is pivotally supported by a shaft and horizontally moves along the surface of the disk one-dimensionally, thereby performing read/write. In the case of a card type recording medium, a magnetic recording layer is formed on the surface of, for instance, a rectangular card-shaped substrate. A read/write head moves along the surface of the card in X- and Y-directions two-dimensionally, thereby performing read/write. In this case, a plurality of read/write heads may be provided in association with one recording surface of one card.

Recording regions, which are surrounded and defined by isolation regions, are formed on the substrate. Recording dots, which are formed of a dot-like magnetic recording layer, are arrayed within the recording regions. The recording region is a region where recording dots are arrayed and read/write is performed on the recording dots. In general, the isolation regions are formed in a track length direction and a track width direction, and each recording region has a substantially tetragonal shape.

In embodiments, the recording dots include first recording dots arrayed in a line in each edge part of each recording region along the isolation region and second recording dots arrayed into a regular lattice in a central part of each recording region, and a distance between a first recording dot and a second recording dot which are nearest neighboring is larger than a distance between second recording dots which are nearest neighboring. It is not necessary that the distance between the nearest neighboring first and second recording dots be larger than the distance between the nearest neighboring second recording dots, with respect to all the pairs of nearest neighboring first and second recording dots. The distance between an arbitrary pair of the nearest neighboring first and second recording dots may be equal to the distance between the nearest neighboring second recording dots. However, on average, the distance between the nearest neighboring first and second recording dots is larger than the distance between the nearest neighboring second recording dots.

In the embodiments, each on the recording dots is used as one bit, in which a user data is recorded on the second recording dots and a read-only data is recorded on the first recording dots.

As described above, the second recording dots are arrayed to form a regular lattice. The term "regular lattice" is referred to an array in which the coordinates indicative of the positions of individual recording dots are arrayed at predetermined space two-dimensionally. The coordinates of the regular lattice arrayed two-dimensionally are represented by the sum of the integer times the fundamental vectors extending in two different directions. The "fundamental vectors" represent, in the tetragonal lattice, the two vectors of the same magnitude, which cross each other at right angles, and, in the hexagonal lattice, the vectors of the same magnitude, which cross each other at an angle of 120°. The lattice position is represented by the sum of the integer times the two vectors, which integer is called an index. The "lowest-indexed plane" denotes the directions represented by the single fundamental vector alone. The lattice is arrayed in these directions at a highest density. For example, the lowest-indexed plane of a tetragonal lattice indicates two orthogonal linear directions which connect nearest neighboring lattice points. The lowest-indexed plane of a hexagonal lattice indicates three linear directions which intersect at 60° or 120° and connect nearest neighboring lattice points.

In the embodiments, in order to array recording dots in the recording regions, use is made of a self-assembling phenomenon of an organic material or fine particles. The self-assembling is a phenomenon in which a material, e.g. a block copolymer, spontaneously causes pattern formation upon phase separation or agglomeration. If the formation of a self-assembling pattern is used in the fabrication of patterned media, it becomes possible to form, without depending on artificial pattern formation by, e.g., photolithography or electron beam lithography, patterns of a small-size at low cost and at high speed, which have difficulty in fabrication by lithography. Further, recording dots can be formed by transferring self-assembled patterns to the magnetic recording layer.

Patterning by self-assembling can be advantageously applied entirely to a large area. However, patterning by self-assembling has a disadvantage that it cannot control the pattern orientation. As a result, many microstructures having regularly arrayed patterns are formed at random, and defects occur at interfaces between the microstructures. To avoid this problem, it is effective to adopt a method of forming guide patterns, which correspond to isolation regions, on a substrate and to define in advance the regions and directions in which self-assembling patterns are generated. In the self-assembling phenomenon, dots of the self-assembling material are arrayed so as to be close-packed in recording regions. For example, formed is a hexagonal close-packed structure in which six dots are arrayed around one dot. Preferably, the guide patterns suited to the hexagonal close-packed structure should define recording regions of a regular triangle, a parallelogram or a hexagon. Since the self-assembling phenomenon can relax a slight structural displacement, there is no problem even if the angle of 60° or 120° of the recording region deviates by about ±10°.

The guide patterns bring about difference in a surface condition on the surface of a substrate or on the surface of a thin film formed on the substrate. The guide patterns are intended to array dots of self-assembling particles on the recording regions that are defined by the guide patterns. The "difference in surface condition" means, for instance, a physical protruded structure, a difference in surface potential, a difference in surface tension, or hydrophilic/hydrophobic properties. Examples of the method of forming the guide pattern include a method using nano-imprint lithography, a method using a scanning probe microscope such as an atomic force microscope, a scanning tunneling microscope or a near-field optical scanning microscope, and a method using photolithography or electron beam lithography.

In a patterned media in which recording dots are arrayed with very small distance, there is a case in which a read-only data recorded on a specified dot, such as an address data or a cryptographic data, is erroneously erased at in read/write operations. In order to prevent erase error of the read-only data, it is preferable to arrange first recording dots for read-only data at positions apart from the second recording dots for user data to be written and read.

If the size of the recording region matches with the array pitch of the dots and the amount of the self-assembling material when dots of the self-assembling material are arrayed in the recording regions, they are arrayed at equal intervals. On the other hand, for example, in the case where the length of one side of the recording region deviates from an integer number of times of the array pitch of the dots of the self-assembling material, or in the case where the amount of the self-assembling material is excessively large or small relative to the size of the recording region, the dots are not arrayed in close-packing within the recording region. In addition, in the case where the guide patterns are formed as protruded portions, interaction may occur between the self-assembling material and the side wall of the guide pattern, by which some of the self-assembling particles may be positioned near the side wall of the guide pattern. In the embodiments, by intentionally avoiding the optimal conditions, for example, by making the amount of the self-assembling material put in the recording region different from an optimal value, it becomes possible to fabricate a recording medium in which the first recording dots for read-only data are positioned away from the second recording dots for user data.

Some examples of magnetic recording media according to embodiments of the invention will now be described with reference to the accompanying drawings.

FIG. 1A is a plan view of a magnetic recording medium including a parallelogrammic recording region 4 defined by guide patterns 3, and first recording dots 11 and second recording dots 12 arrayed in the recording region 4. In the recording region 4, a non-recording material is normally filled in parts where the first and second recording dots 11 and 12 are not formed, but no material may be filled in such parts. A distance (pitch) between the nearest neighboring second recording dots 12, among the second recording dots 12 arrayed to form a regular lattice in the central part of the recording region, is represented by $P_{22}$. A distance between the first recording dot and second recording dot which are nearest neighboring, among the first recording dots 11 arrayed a line in each edge part of the recording region 4 and second recording dots 12 arrayed in the central part of the recording region 4, is represented by $P_{12}$. In the embodiments of the present invention, the distance $P_{12}$ is larger than the distance $P_{22}$. From the standpoint of recording density, the distance $P_{12}$ should preferably be less than three times the distance $P_{22}$, and more preferably less than double the distance $P_{22}$. The distance between the two nearest neighboring recording dots means a distance between the centers of the two recording dots (strictly speaking, a distance between the centers of gravity of the two recording dots). It is not necessary that the distance $P_{12}$ be larger than the distance $P_{22}$ with respect to all distances $P_{12}$ between pairs of nearest neighboring first and second recording dots. Some of the distances $P_{12}$ between pairs of nearest neighboring first and second recording dots may be equal to the distance $P_{22}$. If the distance $P_{12}$ between the nearest neighboring first recording dot 11 and second recording dot 12 is set to be larger than the distance $P_{22}$ between the nearest neighboring second recording dots, it becomes possible to clearly distinguish the first recording dots 11 from the second recording dots 12. Therefore, since write errors to the first recording dots 11 occur less easily, the first recording dots 11 are suited to write a read-only data.

Figure 1B:
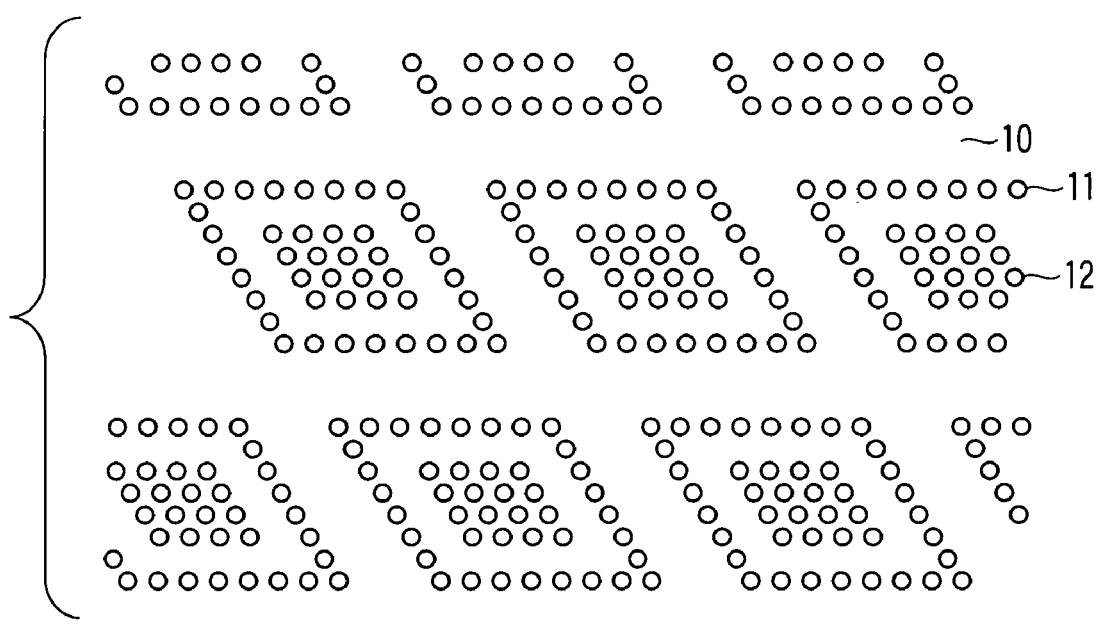

FIG. 1B is a plan view showing a broader area of the magnetic recording medium shown in FIG. 1A. The recording regions including the first recording dots 11 and second recording dots 12 are defined by isolation regions 10 corresponding to the guide patterns. The isolation regions 10 may be formed of the remained guide patterns, or may be regions from which the guide patterns are removed. The width of the isolation regions 10 should preferably be larger than 1.5 times the distance $P_{12}$ between the nearest neighboring first recording dot 11 and second recording dot 12, and smaller than 3 times the distance $P_{12}$. The width of the isolation region 10 should preferably be less than the width of the recording region, and should more preferably be less than ½ of the width of the recording region.

Figure 2A:
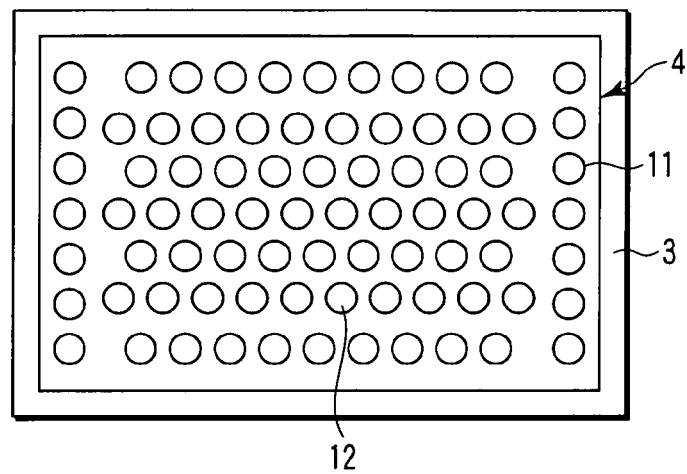
FIGS. 2A and 2B are plan views of a magnetic recording medium according to another embodiment of the invention.

FIG. 2A is a plan view of a magnetic recording medium including a rectangular recording region 4 that is defined by guide patterns 3, and first recording dots 11 and second recording dots 12 arrayed in the recording region 4. When the recording region 4 is rectangular as shown, the first recording dots 11 are arrayed parallel to the guide pattern 3 both in the major axis direction and minor axis direction. The second recording dots 12 are arrayed parallel to the guide pattern 3 in the major axis direction, but the second recording dots 12 have, in the minor axis direction, a second axis at ±60° with respect to the guide pattern 3 in accordance with the hexagonal lattice. In this case, too, the distance $P_{12}$ between the nearest neighboring first recording dot 11 and second recording dot 12 is larger than the distance $P_{22}$ between the nearest neighboring second recording dots 12, and should preferably be less than three times the distance $P_{22}$ and should more preferably be less than double the distance $P_{22}$.

Figure 2B:
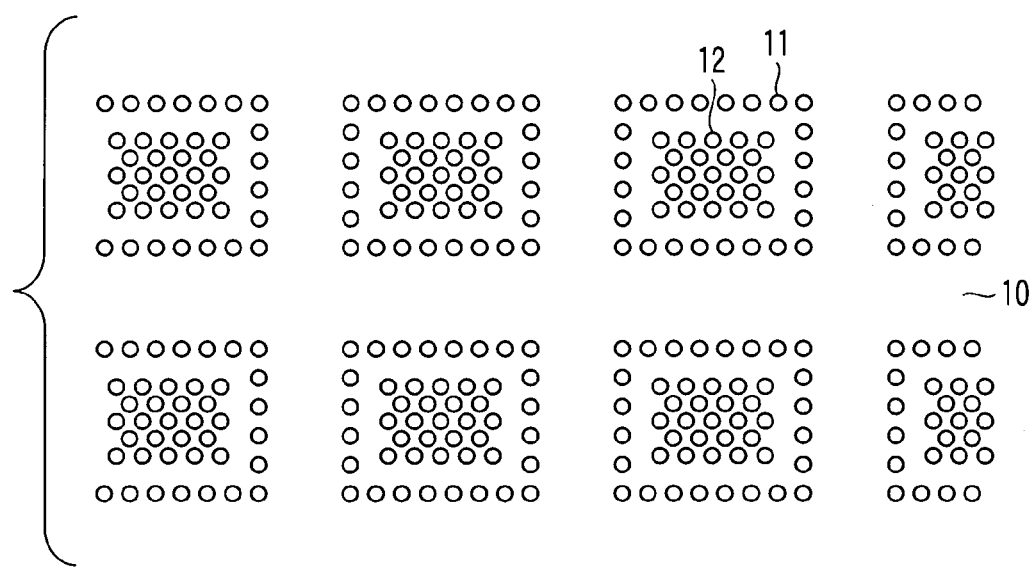

FIG. 2B is a plan view showing a broader area of the magnetic recording medium shown in FIG. 2A. The recording regions including the first recording dots 11 and second recording dots 12 are defined by isolation regions 10 corresponding to the guide patterns. In this case, too, the width of the isolation region 10 should preferably be larger than 1.5 times the distance $P_{12}$ between the nearest neighboring first recording dot 11 and second recording dot 12, and less than 3 times the distance $P_{12}$. The width of the isolation region 10 should preferably be less than the width of the recording region, and should more preferably be less than ½ of the width of the recording region.

Figure 3A:
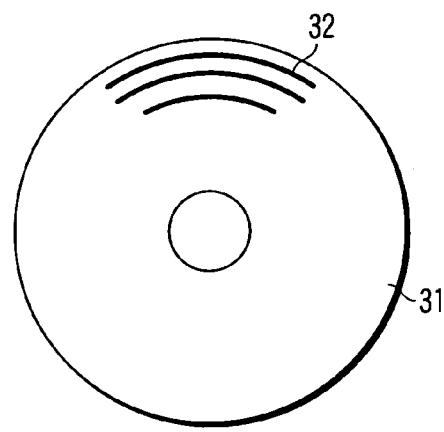
FIGS. 3A and 3B are plan views of a magnetic recording medium according to still another embodiment of the invention.
Figure 3B:
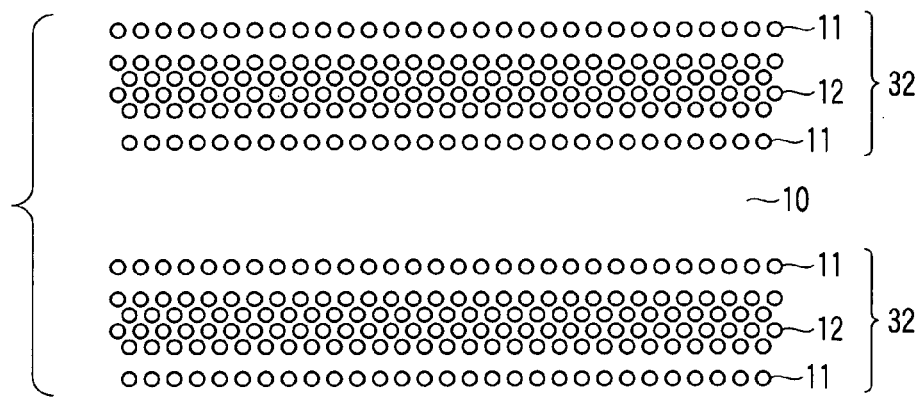

FIG. 3A is a plan view showing recording tracks 32 along the circumferential direction on a disk-shaped magnetic recording medium 31. FIG. 3B is a plan view showing parts of the recording tracks shown in FIG. 3A. As shown in FIG. 3B, first recording dots 11, arrayed in a line in each edge part of the recording track 32 along the isolation region 10, and second recording dots 12, arrayed in the central part of the recording track 32 to form a regular lattice, are formed in the recording tracks 32 defined by the isolation regions 10 formed in the circumferential direction. The distance $P_{12}$ between the nearest neighboring first recording dot 11 and second recording dot 12 is larger than the distance $P_{22}$ between the nearest neighboring second recording dots. For the purpose of convenience of description, FIG. 3B depicts the isolation regions 10 and recording tracks 32 in a linear shape.

Figure 4:
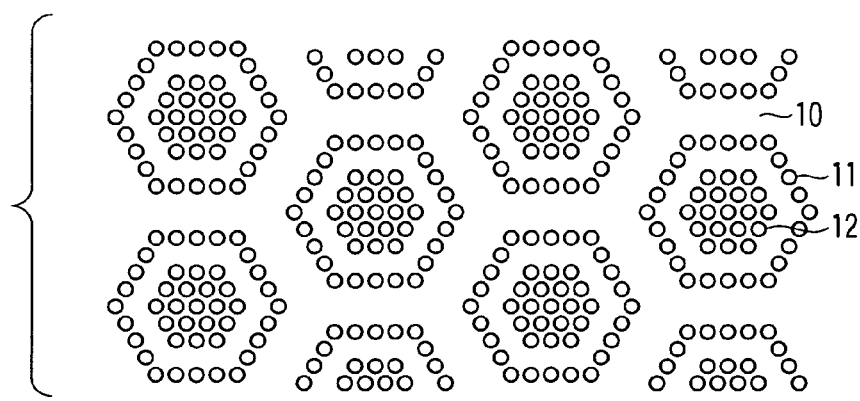
FIG. 4 is a plan view of a magnetic recording medium according to still another embodiment of the invention.

FIG. 4 is a plan view of a magnetic recording medium including hexagonal recording regions defined by isolation regions 10, and first recording dots 11 and second recording dots 12 arrayed in the recording region. In this case, too, the distance $P_{12}$ between the nearest neighboring first recording dot 11 and second recording dot 12 is larger than the distance $P_{22}$ between the nearest neighboring second recording dots 12, and should preferably be less than three times the distance $P_{22}$ and more preferably be less than double the distance $P_{22}$.

Next, referring to FIGS. 5A, 5B, 5C and 5D, a method of fabricating a magnetic recording medium according to an embodiment will be described. In this embodiment, a block copolymer is used as a self-assembling material.

As shown in FIG. 5A, a magnetic recording layer 2 is formed on a substrate 1. A control layer, which is used as guide patterns, is formed on the magnetic recording layer 2. The shape of the substrate 1 may be a disk or a card. In this example, a resist is applied as the control layer. An imprint stamper 50 having a protrusions corresponding to the recording regions is pressed on the resist to transfer patterns of the imprint stamper 50 to the resist, thereby forming guide patterns 3. FIG. 5B shows the state that the imprint stamper 50 has been removed. Protrusions of the resist are used as the guide patterns 3, and recesses of the resist are used as the recording regions 4. Alternatively, the guide patterns may be formed by photolithography or electron-beam lithography.

As shown in FIG. 5C, a block copolymer is applied as the self-assembling material and is filled in the recording regions 4. An example of the block copolymer is polystyrene (PS)-polymethyl methacrylate (PMMA). Subsequently, anneal is performed to cause phase separation in the block copolymer. In this case, dots of PS, which is the B polymer of the AB block copolymer, is arrayed in the matrix 53 of PMMA which is the A polymer of the AB block copolymer. Use is made of the feature that PS has higher etching resistance to oxygen than PMMA. It should suffice if PS has a dot shape in a plan view, and PS may be spherical or cylindrical in a three-dimensional geometry.

The array pitch of the self-assembling material should preferably be 200 nm or less, at which the advantage of improvement in recording density is obtained, and should more preferably be 100 nm or less, and should still more preferably be 50 nm or less. However, if the array pitch is less than 1 nm, a problem of thermal fluctuation of the magnetic recording layer would disadvantageously arise. When the AB block copolymer, for instance, is used as the self-assembling material, the array pitch of dots can be adjusted, for example, in accordance with the molecular weights of the A polymer and B polymer.

In this embodiment, as a result of phase separation, first recording dots 51 arrayed in a line in each edge part of each recording region 4 along the isolation region 3 and second recording dots 52 arrayed into a regular lattice in the central part of each recording region 4 are formed, by which a distance between the nearest neighboring first recording dot 51 and second recording dot 52 is made larger than a distance between the nearest neighboring second recording dots 52.

This arrangement of the first dots 51 and second dots 52 can be realized by properly setting the height of the protrusions of the guide patterns 3.

Figure 6A:
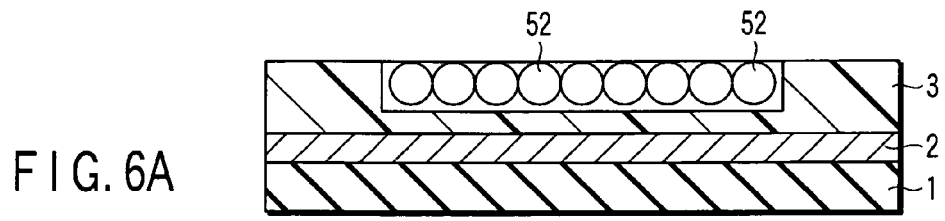
FIGS. 6A and 6B are cross-sectional views for explaining an optimal height of guide patterns.

In the case where the height of the protrusions of the guide patterns 3 is small, as shown in FIG. 6A, all dots are arrayed at an equal interval (equal pitch) if the size of the recording region matches with the pitch of dots. On the other hand, if the height of the protrusions of the guide patterns 3 is too large, dots are formed in multiple layers and a problem arises with the etching shape.

Figure 6B:
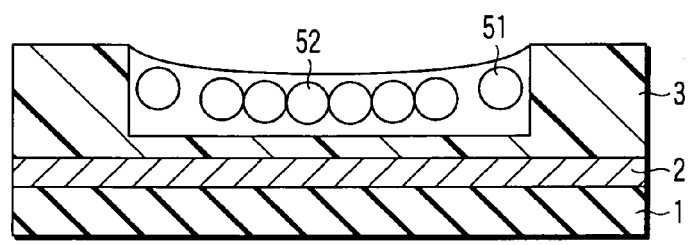

On the other hand, as shown in FIG. 6B, if the height of the protrusions of the guide patterns 3 is set to be slightly higher than that in a conventional method, the amount of the self-assembling material (block copolymer) filled in the recording regions is small and the B polymer (PS in this embodiment) near the side wall of the guide pattern 3 interacts with the latter during phase separation, the block copolymer can be phase separated such that the distance between the nearest neighboring first dot 51 and second dot 52 may become larger than the distance between the nearest neighboring second dots 52. For the above reason, it is preferable to set the height of the protrusions of the guide patterns 3 at ⅔ times to two times the distance between the nearest neighboring second dots 52.

As shown in FIG. 5D, by reactive etching using oxygen gas, only the first and second dots 51 and 52 of the PS are left and the PMMA and guide patterns 3 are etched.

As shown in FIG. 5E, using the first and second dots 51 and 52 of the PS as masks, the magnetic recording layer 2 is etched by Ar ion milling, and the patterns of the first and second dots 51 and 52 of the PS are transferred. As a result, the exposed regions of the substrate 1 under the guide patterns 3 become isolation regions 10, and the first recording dots 11 arrayed in a line in each edge part of each recording region 4 along the isolation region 10 and second recording dots 12 arrayed into a regular lattice in a central part of each recording region 4 are formed. Further, the distance between the nearest neighboring first recording dot 11 and second recording dot 12 is larger than the distance between the nearest neighboring second recording dots 12.

In methods of fabricating magnetic recording media according to other embodiments of the invention, various modifications are applicable.

Figure 7:
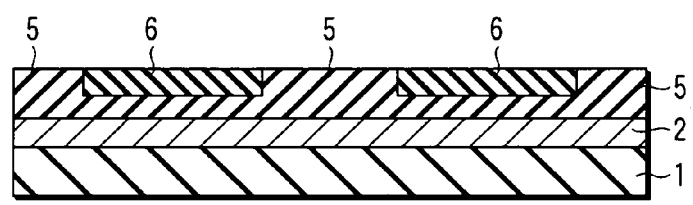
FIG. 7 is a cross-sectional view illustrating a method of fabricating a magnetic recording medium according to another embodiment of the invention.

In FIG. 5, the guide patterns are formed by using the resist. Alternatively, the guide patterns may be formed by other methods. For example, as shown in FIG. 7, a magnetic recording layer 2 is formed on a substrate 1, and a control layer which is used as guide patterns is formed on the magnetic recording layer 2. The surface state of recording regions 6 alone is varied by using a scanning probe microscope such as an atomic force microscope. Thus, the affinity of the recording regions 6 to the self-assembling material is enhanced, and guide patterns 5 made of the untreated control layer are formed. In this case, dots of the self-assembling material can be arrayed only in the recording regions 6 through adsorption or chemical bonding. In this method, unlike the method shown in FIG. 5, there is no need to form guide patterns having protrusions.

In FIG. 5, the block copolymer is used as the self-assembling material. Alternatively, fine particles may be used as the self-assembling material. Fine particles should be preferably be applied to a substrate in the state that the fine particles are uniformly dispersed in a liquid. The dispersion liquid may be applied to the substrate by methods in which the substrate spin-coated with the dispersion liquid or the substrate is immersed in the dispersion liquid and is then pulled up. The fine particles may be subjected to surface treatment using an organic substance so as to facilitate self-assembling.

Figure 8:
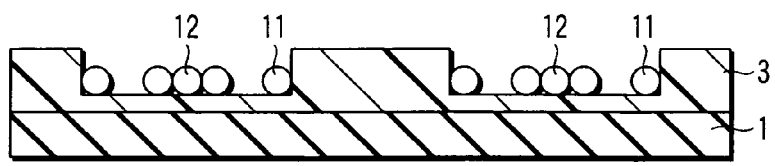
FIG. 8 is a cross-sectional view illustrating a method of fabricating a magnetic recording medium according to still another embodiment of the invention.
Figure 9:
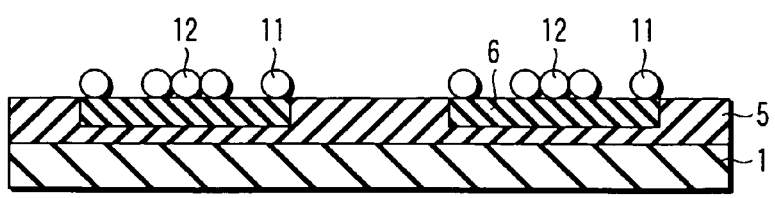
FIG. 9 is a cross-sectional view illustrating a method of fabricating a magnetic recording medium according to still another embodiment of the invention.

In the case of using fine particles of a magnetic material, magnetic fine particles that are arrayed can directly be used as recording dots. FIGS. 8 and 9 show such magnetic recording media.

In FIG. 8, guide patterns 3 having protrusions are formed on a substrate 1. Magnetic fine particles are arrayed in recessed recording regions. Thus, first recording dots 11 arrayed in a line in each edge part of each recording region along the isolation region 3 and second recording dots 12 arrayed into a regular lattice in a central part of each recording region are formed, in which a distance between the nearest neighboring first recording dot 11 and second recording dot 12 is larger than a distance between the nearest neighboring second recording dots 12.

In FIG. 9, a control layer used as guide patterns 5 is formed on a substrate 1, and a part of the control layer is subjected to treatment to form recording regions. Magnetic fine particles are arrayed in the recording regions. Thus, first recording dots 11 arrayed in a line in each edge part of each recording region along the isolation region and second recording dots 12 arrayed into a regular lattice in a central part of each recording region are formed, in which a distance between the nearest neighboring first recording dot 11 and second recording dot 12 is larger than a distance between the nearest neighboring second recording dots 12.

Figure 10A:
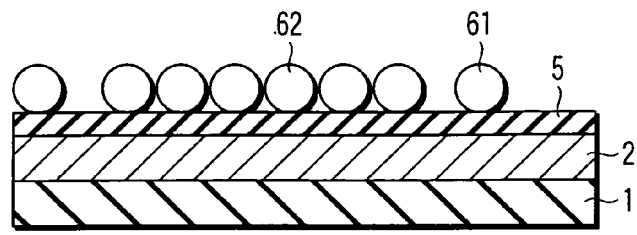
FIGS. 10A and 10B are cross-sectional views illustrating a method of fabricating a magnetic recording medium according to still another embodiment of the invention.
Figure 10B:
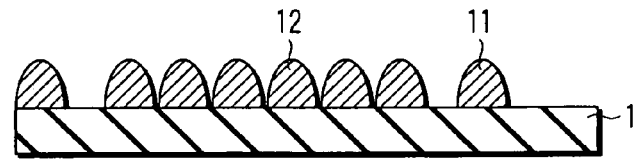

As fine particles of non-magnetic material, fine particles of $SiO_2$, Si, $Al_2O_3$, an organic material such as polystyrene, a metal such as Au, a metal alloy, or ceramics can also be used. In the case of using fine particles of non-magnetic material, the fine particles serve as masks for etching a magnetic recording layer formed between the substrate and the guide patterns. As shown in FIG. 10A, a magnetic recording layer 2 is formed on a substrate 1, and a control layer used as guides pattern 5 is formed on the magnetic recording layer 2. A part of the control layer is subjected to treatment to form recording regions. Non-magnetic fine particles are arrayed on the recording region. Thus, first dots 61 arrayed in a line in each edge part of each recording region along the isolation region and second dots 62 arrayed into a regular lattice in a central part of each recording region are formed, in which a distance between the nearest neighboring first dot 61 and second dot 62 is larger than a distance between the nearest neighboring second dots 62. As shown in FIG. 10B, using the first dots 61 and second dots 62 as masks, pattern transfer is effected on the magnetic recording layer 2. Thus, first recording dots 11 and second recording dots 12 can be formed.

The above-described drawings show the state that no material is filled between the recording dots. However, a non-recording material may be filled between the recording dots.

Next, a magnetic recording apparatus according to an embodiment of the invention is described.

Figure 11:
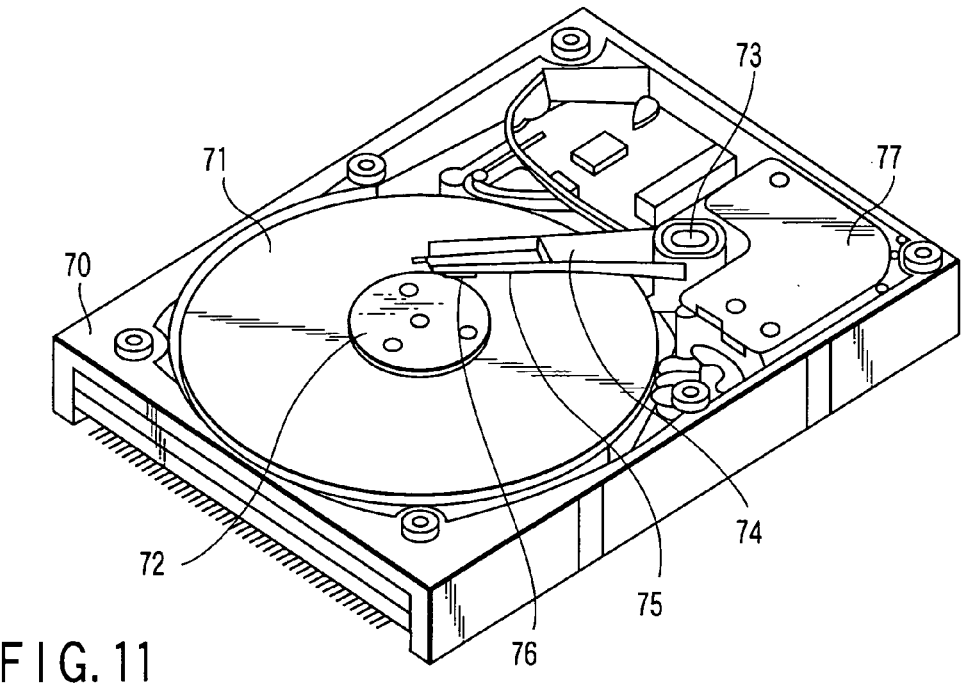
FIG. 11 is a perspective view showing a magnetic recording apparatus according to an embodiment of the invention.

FIG. 11 is a perspective view showing a magnetic recording apparatus (hard disk drive). This magnetic recording apparatus includes, within a chassis 70, the above-described magnetic recording media (patterned media) 71, a spindle motor 72 which rotates the magnetic recording media 71, a head slider 76 including a magnetic head, a head suspension assembly including a suspension 75 which supports the head slider 76 and an actuator arm 74, and a voice coil motor (VCM) 77 serving as an actuator of the head suspension assembly.

The magnetic recording medium 71 is rotated by the spindle motor 72. The magnetic head including a write head and a read head is assembled in the head slider 76. The actuator arm 74 is pivotally attached to a pivot 73. The suspension 75 is attached to one end of the actuator arm 74. The head slider 76 is elastically supported by a gimbal provided on the suspension 75. The voice coil motor (VCM) 77 is provided at the other end of the actuator arm 74. The voice coil motor (VCM) 77 applies a rotational torque about the pivot 73 to the actuator arm 74 so as to position the magnetic head in a flying state at an arbitrary radial position on the magnetic recording media 71.

Figure 12:
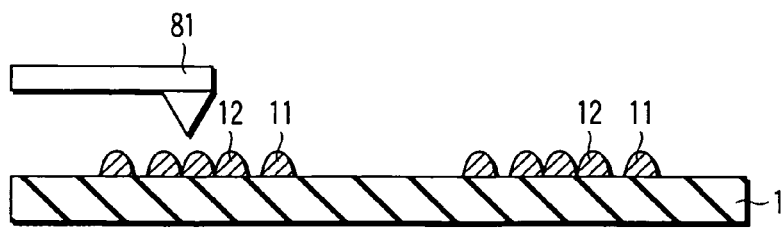
FIG. 12 is a cross-sectional view showing a magnetic recording apparatus according to another embodiment of the invention.

FIG. 12 is a cross-sectional view of a magnetic recording apparatus for a card-type magnetic recording medium. The card-type magnetic recording medium has first recording dots 11 and second recording dots 12 are formed on a substrate 1. A read/write head 81, which is movable in two directions of an X-direction and a Y-direction is disposed above the magnetic recording medium.

EXAMPLES

Examples of the present invention will be described below.

Example 1

In Example 1, a magnetic recording medium is fabricated according to the method of FIG. 5. CoCrPt with a thickness of 20 nm is deposited as a perpendicular magnetic recording material on a glass substrate with a size of 2.5 inches to which a resist with a thickness of 100 nm is applied. A stamper is pressed on the resist to transfer the patterns thereof to the resist by nano-imprinting. As a result, a number of recording regions are formed, each of which has a parallelogrammic shape with one side of 1 µm and is surrounded by guide patterns having a width of 1 µm.

A solution of a PS-PMMA block copolymer with a molecular weight of 75000 in PGMEA, a solvent, is prepared. This solution is applied by spin-coating and filled in recesses corresponding to recording regions. The resultant structure is annealed at 180° and phase-separation is caused to take place in the block copolymer in the recording region. Phase-separated patterns are obtained. In the phase-separated patterns, PS dots are arrayed into hexagonal close packing with an 80 nm pitch in the PMMA matrix, except for the outermost edge portions.

The PMMA matrix is etched by reactive etching using oxygen so as to leave the PS dots. The patterns of the PS dots are transferred to the magnetic recording layer by Ar ion milling using the PS dots as masks. As a result, recording dots with a height of 20 nm are formed on the substrate.

The magnetic recording medium is observed by a magnetic force microscope. Recording dots of 10 rows×10 columns are arrayed in one recording region. It can be observed that the magnetic recording medium includes first recording dots arrayed in a line in each edge part of each recording region and second recording dots arrayed into a regular lattice in a central part of each recording region, in which a distance between the nearest neighboring first recording dot and second recording dot is larger than a distance between the nearest neighboring second recording dots.

A read/write head is provided and a magnetic recording apparatus is fabricated for the resultant magnetic recording medium. The position of the read/write head is controlled two-dimensionally by an arm which operates in two directions, that is, the direction of one side of the recording region of the magnetic recording medium and the direction orthogonal to that side.

In the Example 1, one read/write head is provided for one recording region. Alternatively, one read/write head may be provided for a plurality of recording regions.

Positional data are written on the first recording dots in the edge parts of each recording region of the magnetic recording medium, and user data are written on and read from the second recording dots in the central part of each magnetic recording region.

Example 2

A magnetic recording medium is fabricated by the same method as in Example 1, except for the following points. That is, using a disk-shaped substrate, guide patterns with a height of 50 nm are formed, and a PS-PMMA block copolymer is filled in recording regions. The PS-PMMA block copolymer is annealed and phase separation is caused to take place, thus PS dots are arrayed with a pitch of 45 nm. In this magnetic recording medium, the distance between the nearest neighboring first recording dot and second recording dot is larger than the distance between the nearest neighboring second recording dots.

For the purpose of comparison, a magnetic recording medium is fabricated by the same method as in Example 1, except for the following points. That is, using a disk-shaped substrate, guide patterns with a height of 30 nm are formed, and a PS-PMMA block copolymer is filled in recording regions. The PS-PMMA block copolymer is annealed and phase separation is caused to take place, and PS dots are arrayed with a pitch of 45 nm. In this magnetic recording medium, all recording dots in the recording regions are arrayed at same distance (equal pitch).

These magnetic recording media are installed in hard disk drives, respectively. Address data are recorded in advance on the first recording dots in the edge parts of each recording region. A read/write test of user data is conducted on the second recording dots in the central part of each recording region. Then, write error ratios on the first recording dots are compared.

The write error ratios are $10^{-5.5}$ for the medium of Example 2A and s regards and $10^{-3.8}$ for the medium of the comparative example, respectively. From the results, it is understood that the medium and the magnetic recording apparatus of Example 2 are more excellent than those of the comparative example in terms of the error ratio.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording medium comprising:
   recording regions formed on a substrate;
   isolation regions formed between the recording regions so as to define the recording regions; and
   recording dots formed of a dot-like magnetic recording layer and arrayed in the recording regions, the recording dots including first recording dots arrayed in a line in each edge part of each recording region along the isolation region and second recording dots arrayed into a regular lattice in a central part of each recording region,
   a distance between a first recording dot and a second recording dot which are nearest neighboring being larger than a distance between second recording dots which are nearest neighboring.

2. The medium according to claim 1, wherein the first recording dots are written with a read-only data.

3. The medium according to claim 2, wherein the read-only data is an address data for the recording region.

4. The medium according to claim 2, wherein the read-only data is cryptographic key data.

5. The medium according to claim 1, wherein the distance between the first recording dot and second recording dot which are nearest neighboring is smaller than three times the distance between the second recording dots which are nearest neighboring.

6. The medium according to claim 1, wherein a width of the isolation region is larger than 1.5 times and smaller than 3 times the distance between the first recording dot and second recording dot which are nearest neighboring.

7. The medium according to claim 6, wherein the width of the isolation region is smaller than a width of the recording region.

8. A magnetic recording apparatus comprising:
   the magnetic recording medium according to claim 1; and
   a read/write head.

9. The apparatus according to claim 8, wherein the read/write head is movable in two directions.

10. The apparatus according to claim 8, wherein the magnetic recording medium has a disk shape and is rotatably supported, and the read/write head is pivotally supported.

11. A method of fabricating a magnetic recording medium, comprising:
    depositing a magnetic recording layer on a substrate;
    forming, on the magnetic recording layer, guide patterns corresponding to isolation regions which define recording regions;
    causing a self-assembling material to self-assemble in the recording regions defined by the guide patterns to form first dots arrayed in a line in each edge part of each recording region along the isolation region and second dots arrayed into a regular lattice in a central part of each recording region, a distance between a first dot and a second dot which are nearest neighboring being larger than a distance between second dots which are nearest neighboring; and
    transferring patterns of the first and second dots to the magnetic recording layer to form first recording dots and second recording dots which are formed of a dot-like magnetic recording layer.

12. The method according to claim 11, further comprising:
    forming the guide patterns in protruded portions and defining the recording regions as recessed portions surrounded by the protruded portions;
    applying a block copolymer used as the self-assembling material to the recording regions defined as the recessed portions; and
    causing the block copolymer to take place phase separation to form the first and second dots.

13. The method according to claim 12, wherein a height of the protruded portions as the guide pattern is set at $2/3$ times to 2 times the distance between the second dots which are nearest neighboring.

* * * * *